(12) United States Patent
Morimura

(10) Patent No.: US 10,391,559 B2
(45) Date of Patent: Aug. 27, 2019

(54) MACHINE TOOL

(71) Applicant: OKUMA Corporation, Niwa-gun, Aichi (JP)

(72) Inventor: Shoichi Morimura, Niwa-gun (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 15 days.

(21) Appl. No.: 15/603,872

(22) Filed: May 24, 2017

(65) Prior Publication Data

US 2017/0348772 A1 Dec. 7, 2017

(30) Foreign Application Priority Data

Jun. 1, 2016 (JP) .................. 2016-110230

(51) Int. Cl.

| B23B 25/00 | (2006.01) |
|---|---|
| B23Q 7/04 | (2006.01) |
| B23Q 11/10 | (2006.01) |
| B23Q 15/08 | (2006.01) |
| B23Q 17/09 | (2006.01) |
| B23Q 17/20 | (2006.01) |

(Continued)

(52) U.S. Cl.
CPC .............. *B23B 25/00* (2013.01); *B23Q 7/047* (2013.01); *B23Q 11/10* (2013.01); *B23Q 15/08* (2013.01); *B23Q 17/0971* (2013.01); *B23Q 17/0985* (2013.01); *B23Q 17/0995* (2013.01); *B23Q 17/20* (2013.01); *B25J 9/042* (2013.01); *B25J 11/005* (2013.01); *B25J 15/00* (2013.01); *B25J 15/0019* (2013.01); *B25J 19/02* (2013.01); *B23B 2250/12* (2013.01); *B23B 2250/16* (2013.01); *B23Q 15/013* (2013.01); *B23Q 2717/003* (2013.01); *G05B 2219/45136* (2013.01)

(58) Field of Classification Search
CPC .......... B23Q 7/04; B23Q 7/043; B23Q 7/046; Y10T 82/2572; Y10T 82/2571; Y10T 82/2502; Y10T 82/2514; Y10T 82/2521
See application file for complete search history.

(56) References Cited

U.S. PATENT DOCUMENTS

| 3,963,271 A * | 6/1976 | Sugino | .............. B25J 15/103 294/106 |
|---|---|---|---|
| 4,432,063 A * | 2/1984 | Resnick | .............. B25J 9/161 318/568.13 |

(Continued)

FOREIGN PATENT DOCUMENTS

| JP | H05301141 A | 11/1993 |
|---|---|---|
| JP | H05301142 A | 11/1993 |

(Continued)

*Primary Examiner* — Willmon Fridie, Jr.
(74) *Attorney, Agent, or Firm* — Cantor Colburn LLP

(57) ABSTRACT

A machine tool includes a workpiece spindle device which rotates a workpiece, a tool post which can move a tool in a first axis direction (X-axis direction) which is a radial direction of the workpiece and a second axis direction (Z-axis direction) which is an axial direction of the workpiece, and an articulated robot including a plurality of arms, a plurality of joints, and end effectors. The plurality of joints connect the plurality of arms in a rotatable manner around an axis parallel to a third axis (Y-axis) orthogonal to the first axis and the second axis, and the end effectors move in a plane parallel to a movement plane of the tool.

6 Claims, 3 Drawing Sheets

(51) Int. Cl.
*B25J 15/00* (2006.01)
*B25J 9/04* (2006.01)
*B25J 11/00* (2006.01)
*B25J 19/02* (2006.01)
*B23Q 15/013* (2006.01)

(56) References Cited

U.S. PATENT DOCUMENTS

| | | | | |
|---|---|---|---|---|
| 4,838,135 A * | 6/1989 | Hevoyan | ............ | B23Q 7/04 82/124 |
| 4,878,705 A * | 11/1989 | Arnquist | ............ | B25J 15/103 294/116 |
| 5,168,609 A * | 12/1992 | Kojima | ............ | B23B 3/06 29/27 R |
| 5,254,068 A * | 10/1993 | Yamada | ............ | G05B 19/40937 29/27 R |
| 5,758,554 A * | 6/1998 | Miyano | ............ | B23B 3/167 82/1.11 |
| 2004/0080294 A1 * | 4/2004 | Nihei | ............ | B25J 19/02 318/568.16 |
| 2006/0039768 A1 * | 2/2006 | Ban | ............ | G05B 19/4163 409/96 |
| 2009/0143206 A1 * | 6/2009 | Terazono | ............ | B23B 31/39 483/20 |
| 2010/0028117 A1 * | 2/2010 | Nihei | ............ | B25J 9/0009 414/728 |
| 2010/0061830 A1 * | 3/2010 | Kitayama | ............ | B23Q 7/04 414/222.05 |
| 2010/0288088 A1 * | 11/2010 | Miyamoto | ............ | B23Q 1/76 82/1.11 |
| 2016/0129594 A1 * | 5/2016 | Telling | ............ | B25J 9/1676 700/255 |
| 2016/0184947 A1 * | 6/2016 | Itou | ............ | B23Q 11/0046 15/319 |
| 2016/0339553 A1 * | 11/2016 | Nakazawa | ............ | B23Q 11/10 |
| 2017/0008102 A1 * | 1/2017 | Ishikawa | ............ | B23D 55/06 |
| 2017/0113314 A1 * | 4/2017 | Murota | ............ | B08B 5/02 |
| 2017/0312875 A1 * | 11/2017 | Kunihiro | ............ | B23Q 7/043 |
| 2017/0329316 A1 * | 11/2017 | Morimura | ............ | B25J 15/0019 |
| 2018/0059637 A1 * | 3/2018 | Shimodaira | ............ | G05B 19/401 |
| 2018/0093380 A1 * | 4/2018 | Yoshida | ............ | B25J 9/1697 |
| 2018/0126567 A1 * | 5/2018 | Morimura | ............ | B08B 3/02 |

FOREIGN PATENT DOCUMENTS

| | | |
|---|---|---|
| JP | 2010036285 A | 2/2010 |
| JP | 2010064158 A | 3/2010 |

* cited by examiner

MACHINE TOOL

CROSS REFERENCE TO RELATED APPLICATION

The present invention claims priority under 35 U.S.C. § 119 to Japanese Patent Application No. 2016-110230 filed Jun. 1, 2016, including the specification, claims, drawings, and abstract, is incorporated herein by reference in its entirety.

TECHNICAL FIELD

The present disclosure relates to a machine tool having a workpiece spindle device which rotates a workpiece, and a tool post which moves a tool.

BACKGROUND

Recently, demands are increasing for automation and higher performances of machine tools. In order to realize automation, automatic changer apparatuses are proposed such as an automatic tool changer (ATC) which automatically changes tools, and an automatic palette changer (APC) which automatically changes a palette on which a workpiece is mounted. In addition, peripheral apparatuses such as a workpiece supply apparatus such as a loader and a bar feeder are also widely known. In order to realize higher performance, an in-machine measurement and an intelligent system using sensors is also employed.

Further, in order to automate or improve performance of machine tools, in some cases, use of a robot is proposed. For example, JP 2010-36285 A discloses a technique in which a robot provided outside of the machine tool is used, to execute attachment and detachment of the workpiece to and from the machine tool. JP 2010-64158 A discloses a technique in which an articulated robot which travels on a gantry rail attached on an upper part of the machine tool is provided, and the transport of the workpiece or the like among a plurality of machine tools is executed by the articulated robot. JP H5-301141 A and JP H5-301142 A disclose a transporting tool of a workpiece which transports the workpiece by an open/close operation of a grip unit. The transporting tool has an arm shape, and is attached to a body function box. The body function box is also provided at a right side of a spindle head which supports a spindle. The transporting tool can pivot about an axis approximately orthogonal to a long axis of the spindle. The transporting tool can change, by the pivoting movement, between a state in which the arm is approximately horizontal and a state in which the arm is approximately vertical.

However, in the techniques of JP 2010-36285 A and JP 2010-64158 A, the robot is provided outside of the machining chamber. Because of this, when it is desired to access the workpiece and the tool in the machining chamber with the robot, the size of the robot must be increased. A large-size robot, however, not only results in increase in cost and size, but also results in interference with other members, as well as complexity of control due to an increase in the number of joints. In the techniques of JP H5-301141 A and JP H5-301142 A, the robot is provided near the tool spindle. However, the robots of JP H5-301141 A and JP H5-301142 A can only rotate around one axis, and can only transport the workpiece along a predefined route. In other words, with the robots of JP H5-301141 A and JP H5-301142 A, the tool or the workpiece being machined cannot be accessed, and usages of the robot are significantly limited.

An advantage of the present disclosure lies in the provision of a machine tool having a robot which can access a tool and a workpiece, while avoiding an increase in size.

SUMMARY

According to one aspect of the present disclosure, there is provided a machine tool comprising: a workpiece spindle device that rotates a workpiece; a tool post that can move a tool in a first axis direction which is a radial direction of the workpiece, and a second axis direction which is an axial direction of the workpiece; and an articulated robot including a plurality of arms, a plurality of joints, and an end effector, wherein the plurality of joints connect the arms in a manner to be rotatable around an axis parallel to a third axis orthogonal to the first axis and the second axis, and the end effector moves in a plane parallel to a movement plane of the tool.

The end effector may move in a same plane as the movement plane of the tool.

The robot may be attached on the tool post, and may move in the first axis direction and the second axis direction with the tool post. The machine tool may further comprise a tailstock placed opposing the workpiece spindle, and the robot may be attached on the tailstock.

The end effector of the robot may execute at least one of a support of machining of the workpiece by the tool, sensing related to the tool or the workpiece during the machining, and additional machining. The first axis direction may be inclined with respect to a horizontal direction.

According to the machine tool of various aspects of the present disclosure, because the end effector has a configuration to move in a plane parallel to the movement plane of the tool, the end effector can easily access a periphery of the tool while maintaining the overall size of the robot small.

BRIEF DESCRIPTION OF DRAWINGS

Embodiment(s) of the present disclosure will be described by reference to the following figures, wherein.

DESCRIPTION OF EMBODIMENTS

Figure 1:
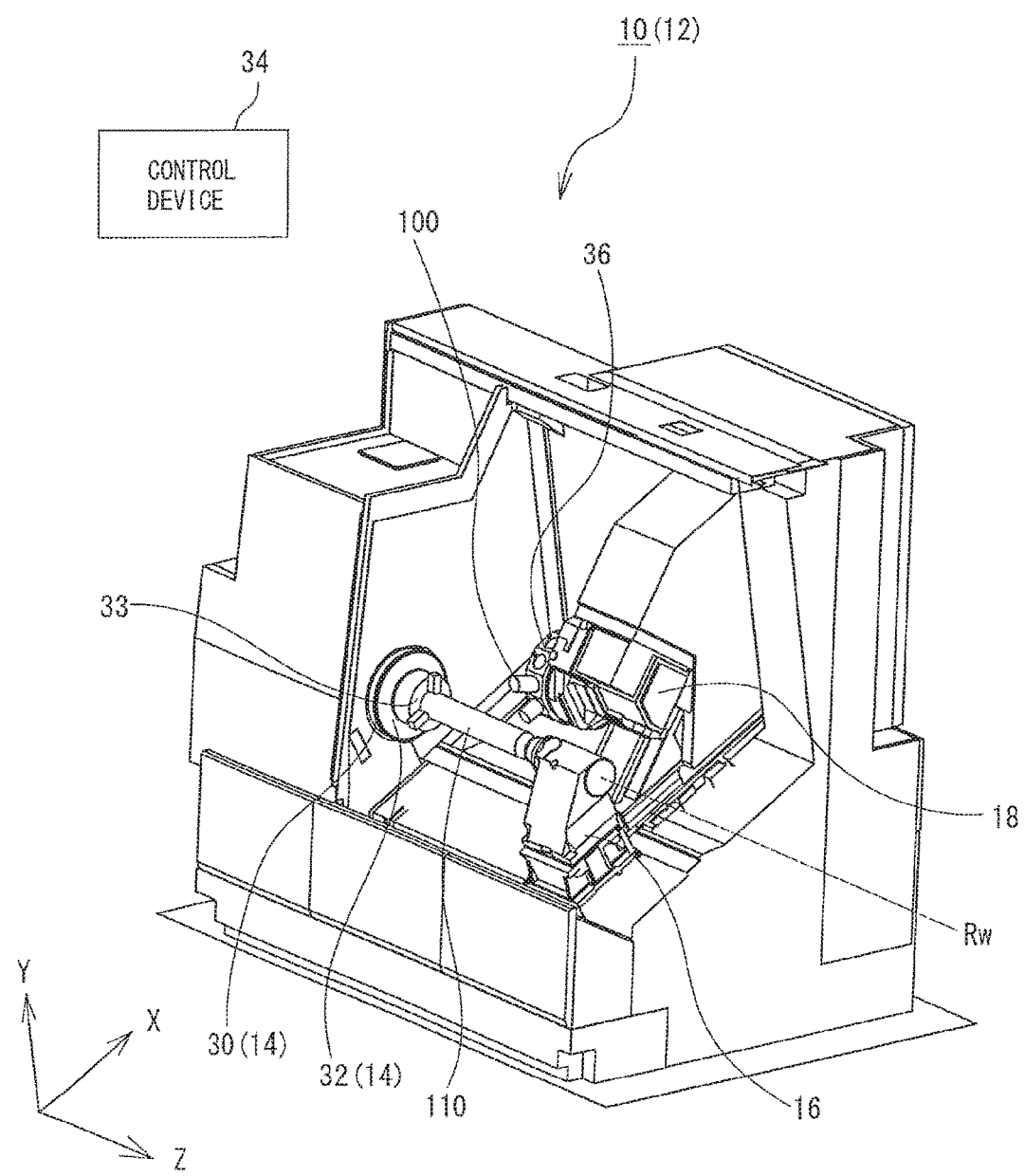
FIG. 1 is a perspective diagram of a machine tool.

A structure of a machine tool 10 will now be described with reference to the drawings. FIG. 1 is a diagram showing a structure of the machine tool 10. In the following description, a rotational axis direction of a workpiece spindle 32 will be referred to as a Z-axis, a movement direction of a tool post 18 orthogonal to the Z-axis will be referred to as an X-axis, and a direction orthogonal to the X-axis and the Z-axis will be referred to as a Y-axis. On the Z-axis, a direction from the workpiece spindle 32 toward a tailstock 16 will be referred to as a positive direction. On the X-axis, a direction from the workpiece spindle 32 toward the tool post 18 will be referred to as a positive direction, and on the Y-axis, an upward direction from the workpiece spindle 32 will be referred to as a positive direction. In addition, in the following description, the description "access" of an end effector 46 means that the end effector 46 of an in-machine robot 20 moves close to the target, to a position where the objective of the end effector 46 can be achieved. Therefore, when the end effector 46 of the in-machine robot 20 is a temperature sensor which contacts the target and detects the temperature thereof, the description "access" means that the end effector 46 moves close to the target, to a position where the end effector 46 contacts the target. When the end effector 46 is a temperature sensor which detects the temperature without contact, the description "access" means that the end effector 46 moves close to the target, to a position where the temperature of the target can be detected.

The machine tool 10 is a lathe which machines a workpiece 110 by bringing a tool 100 held on the tool post 18 into contact with the workpiece 110, which self-rotates. The machine tool 10 is a lathe which is called a turning center which is NC controlled and which holds a plurality of tools 100. A periphery of a body 12 of the machine tool 10 is covered by a cover (not shown). A space defined by the cover is a machining chamber where machining of the workpiece 110 takes place. On the cover, at least one opening and a door which opens and closes the opening (both of which are not shown in the figure) are formed. An operator accesses the body 12 of the machine tool 10, the workpiece 110, or the like through the opening. During the machining, the door provided on the opening is closed. This is for sake of safety and the surrounding environment.

The body 12 comprises a workpiece spindle device 14 which holds one end of the workpiece 110 in a manner to allow self-rotation, the tool post 18 which holds the tool 100, and the tailstock 16 which supports the other end of the workpiece 110. The workpiece spindle device 14 comprises a spindle base 30 having a driving motor or the like built therein, and the workpiece spindle 32 attached to the spindle base 30. The workpiece spindle 32 includes a chuck 33 and a collet which hold the workpiece 110 in a detachable manner, and the workpiece 110 to be held can be arbitrarily exchanged. The workpiece spindle 32 and the chuck 33 also self-rotate with a workpiece rotational axis Rw which extends in the horizontal direction (Z-axis direction in FIG. 1) serving as a center.

The tailstock 16 is placed opposing the workpiece spindle device 14 in the Z-axis direction, and supports the other end of the workpiece 110 held by the workpiece spindle device 14. The tailstock 16 is placed at a position where a center axis of the tailstock 16 coincides with the workpiece rotational axis Rw. On the tailstock 16, a center having a tip sharpened in a conical shape is attached, and during the machining, the tip of the center is in contact with a center point of the workpiece 110. The tailstock 16 is movable in the Z-axis direction so that the tailstock 16 can move toward and away from the workpiece 110.

The tool post 18 holds the tool 100; for example, a tool called a "bite." The tool post 18 is movable in the Z-axis direction; that is, an axial direction of the workpiece 110. In addition, the tool post 18 is placed on a guiderail which extends in the X-axis direction; that is, a radial direction of the workpiece 110, and can be moved also in the X-axis direction. As is clear from FIG. 1, the X-axis direction is inclined with respect to the horizontal direction. On a tip of the tool post 18, a turret 36 which can hold a plurality of tools 100 is provided. The turret 36 is rotatable with an axis extending in the Z-axis direction serving as a center. By rotation of the turret 36, the tool 100 used for machining the workpiece 110 can be suitably changed. By moving the tool post 18 in the Z-axis direction, the tool 100 held on the turret 36 is moved in the Z-axis direction. By moving the tool post 18 in the X-axis direction, the tool 100 held on the turret 36 is moved in the X-axis direction. By moving the tool post 18 in the X-axis direction, an amount of cutting of the workpiece 110 by the tool 100 or the like can be changed. Thus, the tool 100 which is attached on the tool post 18 can be moved in an XZ plane.

Figure 2:
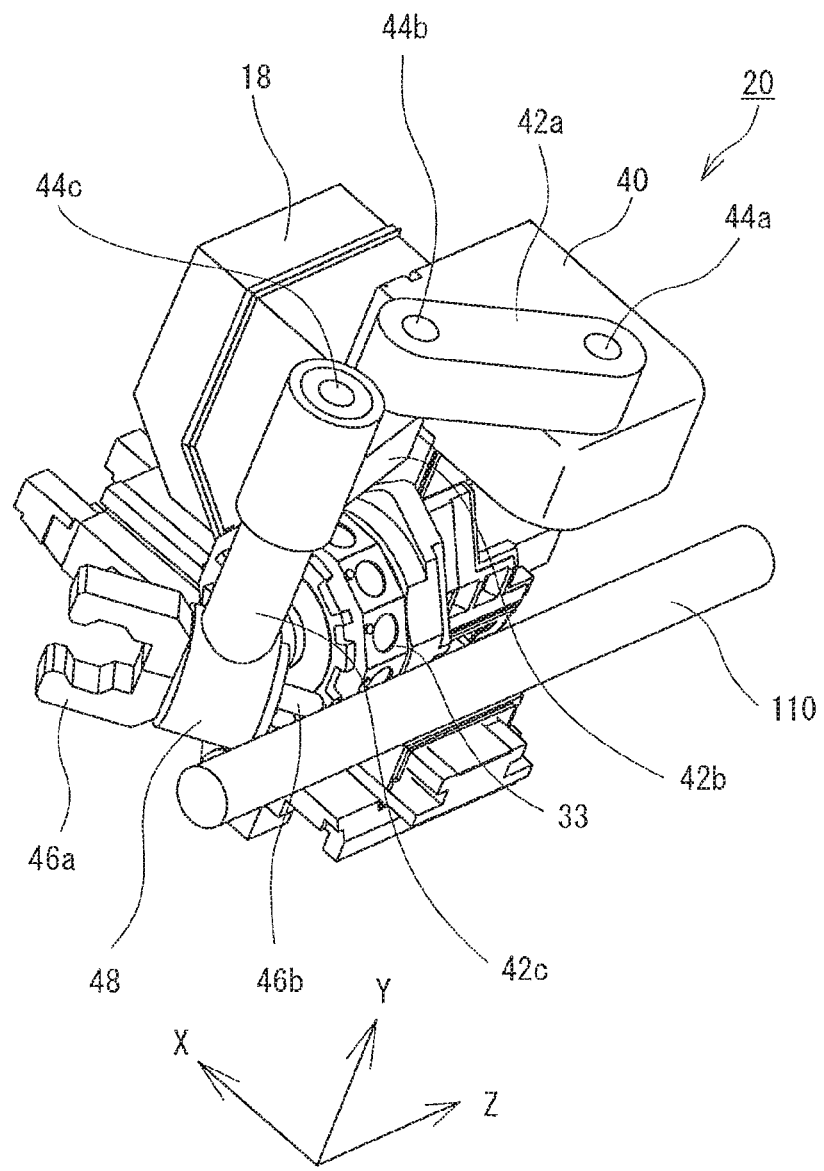
FIG. 2 is a perspective diagram of a periphery of an in-machine robot.

An in-machine robot 20 (not shown in FIG. 1) is attached on the tool post 18. As shown in FIG. 2, the in-machine robot 20 is attached on an upper surface of the tool post 18. The in-machine robot 20 is used for a support of machining, various sensing processes, support works, or the like. A structure and a function of the in-machine robot 20 will be described later in detail.

A control device 34 controls driving of various parts of the machine tool 10 in response to a command from an operator. The control device 34 is formed from, for example, a CPU which executes various calculations, and a memory which stores various control programs and control parameters. The control device 34 further has a communication function, and can exchange various data such as, for example, NC program data, with other devices. The control device 34 may include, for example, a numerical control device that calculates, when necessary, positions of the tool 100 and the workpiece 110. The control device 34 may be a single device or a combination of a plurality of calculator devices.

Figure 3:
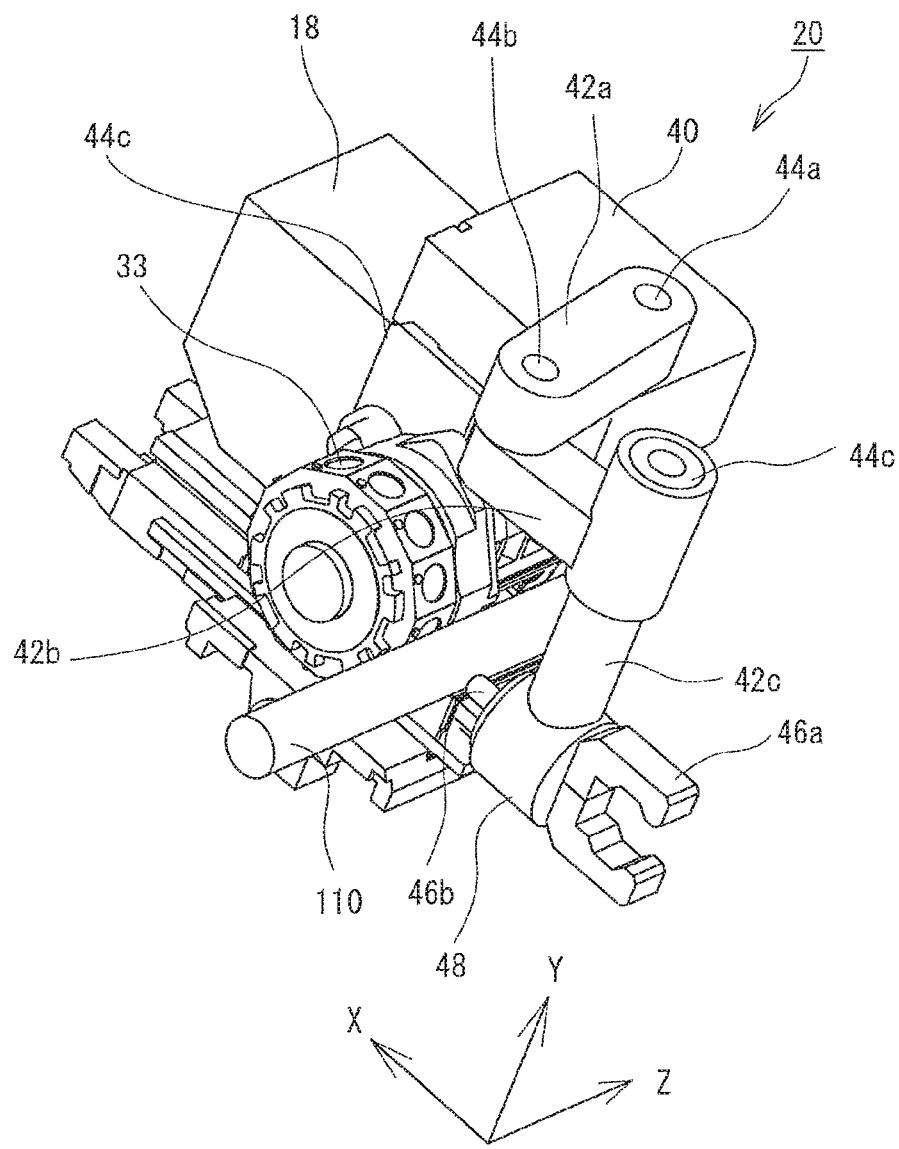
FIG. 3 is a perspective diagram of a periphery of an in-machine robot.

Next, the in-machine robot 20 attached to the tool post 18 will be described with reference to FIGS. 2 and 3. FIGS. 2 and 3 are perspective diagrams of a periphery of the in-machine robot 20. As shown in FIG. 2, the in-machine robot 20 is an articulated robot and an arm-type robot, having a plurality of arms 42a-42d and a plurality of joints 44a-44d. The in-machine robot 20 is attached on the upper surface of the tool post 18 via a connecting mechanism 40.

The in-machine robot 20 comprises first through third arms 42a-42c (hereinafter, when "first" through "third" are not to be distinguished, the letter in the reference numeral will be omitted, and the arms will be simply referred to as "arms"; the same convention is applicable to other constituting elements), first through third joints 44a-44c provided respectively at ends of the arms, and end effectors 46a and 46b. A base end of the first arm 42a is connected to the connecting mechanism 40 via the first joint 44a, a base end of the second arm 42b is connected to a tip end of the first arm 42a via the second joint 44b, and a base end of the third arm 42c is connected to a tip end of the second arm 42b via the third joint 44c. Each of the first through third joints 44a-44c has a swing axis parallel to the Y-axis direction, and each arm 42 swings around the swing axis as a center. An actuator such as a motor is attached to each of the first through third joints 44a-44c, and driving of the actuator is controlled by the control device 34. The control device 34 calculates positions of the end effectors 46a and 46b to be described later, based on an amount of driving of the actuator provided on the joints 44a-44c.

The end effectors 46a and 46b which act on a target are provided on a tip of the third arm 42c. In the present configuration, the first end effector 46a and the second end effector 46b are provided on respective ends of a shaft 48 attached on a tip of the third arm 42c. No particular limitation is imposed on the first and second end effectors 46a and 46b, so long as the end effectors 46a and 46b realize some effect. In the present configuration, a holding device which holds a target is employed as the first end effector 46a, and a sensor which senses information related to a target or a peripheral environment of the target is employed as the second end effector 46b. The form of holding in the holding device may be a hand type which grips the target with a pair of members, a type which suctions and holds the target, or a type which holds the target using a magnetic force or the like. FIGS. 2 and 3 show an example configuration where the first end effector 46a is of a hand type.

The sensor may be, for example, a contact sensor which detects presence/absence of contact with the target, a distance sensor which detects a distance to the target, a vibration sensor which detects vibration of the target, a pressure sensor which detects a pressure applied by the target, a sensor which detects a temperature of the target, or the like. A detection result of these sensors is stored and analyzed in correlation with positional information of the second end effector 46b calculated based on the amounts of driving of the joints 44a-44c. For example, when the second end effector 46b is a contact sensor, the control device 34 analyzes a position, a shape, and a movement of the target based on the timing of detection of the contact with the target and the positional information acquired at this timing.

The end effector 46 described herein, however, is merely exemplary, and may have other forms, so long as the end effector 46 acts on a target. For example, the end effector 46 may be a pressing mechanism which presses a target. Specifically, for example, the end effector 46 may be a roller which is pressed against the workpiece 110 and suppresses vibration of the workpiece 110, or the like.

As an alternative configuration, the end effector 46 may be a device which discharges fluid for supporting machining. Specifically, the end effector 46 may be a device which discharges air for blowing swarf, or which discharges a cooling fluid (cutting oil, cutting water, or the like) for cooling the tool 100 or the workpiece 110. Alternatively, the end effector 46 may be a device which discharges energy or a material for forming a workpiece. Therefore, for example, the end effector 46 may be a device which discharges laser or arc, or a device which discharges a material for layering and forming. Further, as an alternative configuration, the end effector 46 may be a camera which captures an image of the target. In this case, an image obtained by the camera may be displayed on an operation panel or the like.

In either case, in the present configuration, a movement plane of the tool 100 and a movement plane of the end effector 46 are coincided. As a result, the end effector 46 can reliably access a region near the tool 100. Because the workpiece 110 being machined is present near the tool 100, it can be said that the end effector 46 described herein can easily access not only the tool 100, but also the workpiece 110 being machined.

In the present configuration, the in-machine robot 20 has a structure with a plurality of joints which can rotate around an axis parallel to the Y-axis, which is a structure similar to a so-called "scalar-type robot" (horizontal articulated robot). When such a configuration is employed, because the end effector 46 moves in the movement plane of the tool 100, even when a movable range of the in-machine robot 20 is relatively narrow, and consequently, lengths of the arms 42 are relatively short, the end effector 46 can be easily positioned near the tool 100 and the workpiece 110. As a result, it becomes possible to cause the end effector 46 to reliably access the tool 100 and the workpiece 110, while preventing increase in the size of the in-machine robot 20.

The structure of the robot is not limited to the structure having a joint around an axis parallel to the Y-axis, and may be a structure having joints around other axes, for example, the X-axis or the Z-axis (structure similar to a vertical articulated robot). In such a configuration, the numbers of degree of freedom for the range which can be accessed by the end effector and the orientation of the end effector can be increased. Therefore, when it is necessary to access various locations with the end effector such as, for example, the cover of the machining chamber or the like, a structure similar to that of the vertical articulated robot is also useful. However, the in-machine robot 20 of the present configuration only considers access primarily to members around the tool 100 such as, for example, the tool 100, the workpiece 110, the workpiece spindle device 14, and the tailstock 16. In such a configuration, if a structure similar to the vertical articulated robot is employed, an amount of protrusion of the robot to an upper side of the tool post 18 would be increased, resulting in an increase in the size of the machine tool. On the other hand, when the movement plane of the end effector 46 is limited to the plane parallel to the movement plane of the tool as in the in-machine robot 20 of the present configuration, the amount of protrusion of the robot to the upper side of the tool post 18 can be reduced. As a result, a sufficient workability can be secured while preventing an increase in the size of the machine tool.

As is clear from the above description, in the present configuration, the in-machine robot 20 is attached on the tool post 18 so that the in-machine robot 20 can move with the tool post 18. With such a configuration, the in-machine robot 20 can be moved with the movement of the tool post 18; that is, movement of a cutting point, and thus, the end effector 46 can access a region near the cutting point at all times. If a structure is employed in which the in-machine robot 20 does not move with the tool post 18, in order for the in-machine robot 20 to access the cutting point, the in-machine robot 20 must have a movable range wider than or equal to the movable range of the tool post 18. In particular, when the movable range of the tool post 18 is wide in the Z-axis direction in order to handle a long-length workpiece 110, the in-machine robot 20 must be made large in order to cover the movable range of the tool post 18. In contrast, when a structure is employed in which the in-machine robot 20 moves with the tool post 18 as in the present configuration, it becomes possible for the end effector 46 to access a region near the cutting point at all times while suppressing an increase in the size of the in-machine robot 20.

In the present configuration, the in-machine robot 20 is attached on the upper surface of the tool post 18, rather than a front surface (a surface opposing the workpiece 110) or a side surface of the tool post 18. With such a configuration, interference between the tool post 18 and the in-machine robot 20 tends to occur less frequently.

Next, a movement of the in-machine robot 20 as described above will be described. When the workpiece 110 is machined, the tool 100 held on the tool post 18 is brought into contact with the workpiece 110 while the workpiece 110 is self-rotated by the workpiece spindle device 14. The in-machine robot 20 attached on the tool post 18 executes a support of machining, sensing processes, support work, or the like as necessary. In this process, the in-machine robot 20 moves the joints 44 as necessary, to change the end effector 46.

The in-machine robot 20 may be used for various purposes. For example, the in-machine robot 20 may help the machining during the machining of the workpiece 110. Specifically, for example, the in-machine robot 20 supports at least one of the workpiece 110 and the tool 100 during the machining. During the machining, because the workpiece 110 rotates around the Z-axis, when the workpiece 110 is to be supported by the end effector 46 during the machining, it is desirable that a roller which does not block rotation of the workpiece 110, or a hand having such a roller is employed as the end effector 46. In either case, by supporting the workpiece 110 or the tool 100 with the end effector 46, it becomes possible to suppress vibration and deflection of the workpiece 110 or the tool 100 having a low rigidity. In addition, by suppressing the vibration of the workpiece 110, a complex workpiece shape can be handled. Further, as an alternative configuration, the in-machine robot 20 may apply vibration to the workpiece 110 and the tool 100 during the machining. With such a configuration, a special machining process can be enabled in which the workpiece is cut while vibration is applied. As a further alternative configuration, the in-machine robot 20 may discharge cooling fluid (cutting oil, cutting water) or air for removing swarf during the machining. By discharging the cooling fluid or the air by the in-machine robot 20 whose position and orientation can be freely changed, it becomes possible to more freely control the cutting characteristic and the temperature of the workpiece 110 and the tool 100.

Alternatively, the in-machine robot 20 may execute various sensing processes, for example, during the machining of the workpiece 110, or before or after the machining. FIGS. 2 and 3 show a sensing process by the second end effector 46b which is a sensor. Specifically, for example, the in-machine robot 20 may monitor a cutting state (precision of machined surface and state of swarf). As an alternative configuration, the in-machine robot 20 may sense the states of the workpiece 110 and the tool 100, for example, the temperature, the vibration, the distortion, or the like during the machining, and output the sensed result to the control device 34. In this case, the control device 34 desirably changes various machining conditions (feed rate, rotational rate, or the like) as necessary, based on the information detected by the in-machine robot 20. Alternatively, the in-machine robot 20 may have a structure in which the shape of the workpiece 110 is measured before start of the machining or after completion of the machining. By measuring the shape of the workpiece 110 before the start of the machining, it is possible to reliably prevent error in the attachment of the workpiece 110. By measuring the shape of the workpiece 110 after the completion of the machining, it is possible to judge quality of the machining result. As an alternative configuration, for example, the in-machine robot 20 may measure the states of the tool 100 (amount of wear, or the like) before the start of the machining or after the completion of the machining. As an alternative configuration, the in-machine robot 20 may inspect the tool (checking presence/absence of wear) or inspect movable parts of the machine tool 10 (the workpiece spindle device 14, the tailstock 16, or the like) during a period in which the machining is not executed.

Further, the in-machine robot 20 may execute the work which has been executed by an out-of-machine robot in the related art, during the machining or after the completion of the machining. For example, the in-machine robot 20 may execute additional machining (such as removal machining such as trimming and die polishing, surface reformation, adding machining, or the like) on the workpiece 110. In addition, the in-machine robot 20 may transport, exchange, or arrange the workpiece 110 and the tool 100. Further, the in-machine robot 20 may examine or assemble various components.

The structure of the in-machine robot 20 described above is merely exemplary. The structures of the in-machine robot 20 may be suitably changed, so long as the in-machine robot 20 has a plurality of joints which can rotate around the Y-axis, and the end effector 46 can move in a plane parallel to the movement plane of the tool 100. Therefore, the numbers of joints 44 and the arms 42 of the in-machine robot 20, the directions of swing, or the like may be suitably changed.

In addition, in the present configuration, the movement plane of the end effector 46 and the movement plane of the tool 100 are coincided. The movement planes do not need to coincide with each other, so long as the movement planes are parallel to each other. Therefore, a structure may be employed in which the end effector 46 moves in a plane positioned slightly above the movement plane of the tool 100 or slightly below the movement plane of the tool 100. In the present configuration, as the joint 44 of the in-machine robot 20, only joints which can rotate around an axis parallel to the Y-axis are shown, but alternatively, for example, similar to a typical scalar-type robot, a joint which can linearly move in an axis direction parallel to the Y-axis may be provided at a tip of the third arm or at a root of the first arm. In this case, the in-machine robot 20 would have a total of four degrees of freedom, including positioning of three degrees of freedom of the planes and an up-and-down movement along the axis direction of the arm, having one degree of freedom.

Further, in the present configuration, the in-machine robot 20 is attached on the tool post 18 which holds the tool 100, but alternatively, in the case of a small-size lathe which does not handle a long-length workpiece, the in-machine robot 20 may be attached on other locations. For example, the in-machine robot 20 may be attached on a non-movable member of the machine tool or on the tailstock 16. In this case also, by employing a structure of the in-machine robot 20 in which the end effector 46 can move in a plane parallel to the movement plane of the tool 100, it becomes possible to cause the end effector 46 to easily access a region near the cutting point.

Alternatively, while the machine tool 10 exemplified herein is a lathe, more specifically, a turning center, the in-machine robot 20 may be used for machine tools of other kinds. For example, the in-machine robot 20 may be equipped on a multi-tasking machine having a lather-turning function to rotate and cut a workpiece, and a rotation-cutting function to cut the workpiece by rotating a rotary tool. Alternatively, as another form, the in-machine robot 20 may be equipped on a cylindrical grinding machine which grinds by rotating the workpiece.

Further, in the present configuration, two end effectors 46 are provided on one in-machine robot 20, but the number of end effectors 46 may be suitably changed. Therefore, for example, the in-machine robot 20 may have a single end effector 46, or three or more end effectors.

The invention claimed is:

1. A machine tool comprising:
    a workpiece spindle device that rotates a workpiece;
    a tool post that can move a tool in a first axis direction which is a radial direction of the workpiece, and a second axis direction which is an axial direction of the workpiece; and
    an articulated robot including a plurality of arms, a plurality of joints, and an end effector, wherein
    the plurality of joints connect the arms in a manner to be rotatable around an axis parallel to a third axis orthogonal to the first axis and the second axis,
    the end effector moves in a plane parallel to a movement plane of the tool, and
    the robot is attached on the tool post, and moves in the first axis direction and the second axis direction with the tool post.

2. The machine tool according to claim 1, wherein the end effector moves in a same plane as the movement plane of the tool.

3. The machine tool according to claim 1, further comprising
a tailstock placed opposing a workpiece spindle, wherein the robot is attached on the tailstock.

4. The machine tool according to claim 1, wherein the end effector of the robot is structured to execute at least one of:
supporting the workpiece during machining by the tool;
sensing a status of the tool or the workpiece; and
machining the workpiece.

5. The machine tool according to claim 1, wherein the first axis direction is inclined with respect to a horizontal direction.

6. The machine tool according to claim 1, wherein one of the plurality of arms that is located at a tip is elongated in the third axis direction.

* * * * *